UNITED STATES PATENT OFFICE.

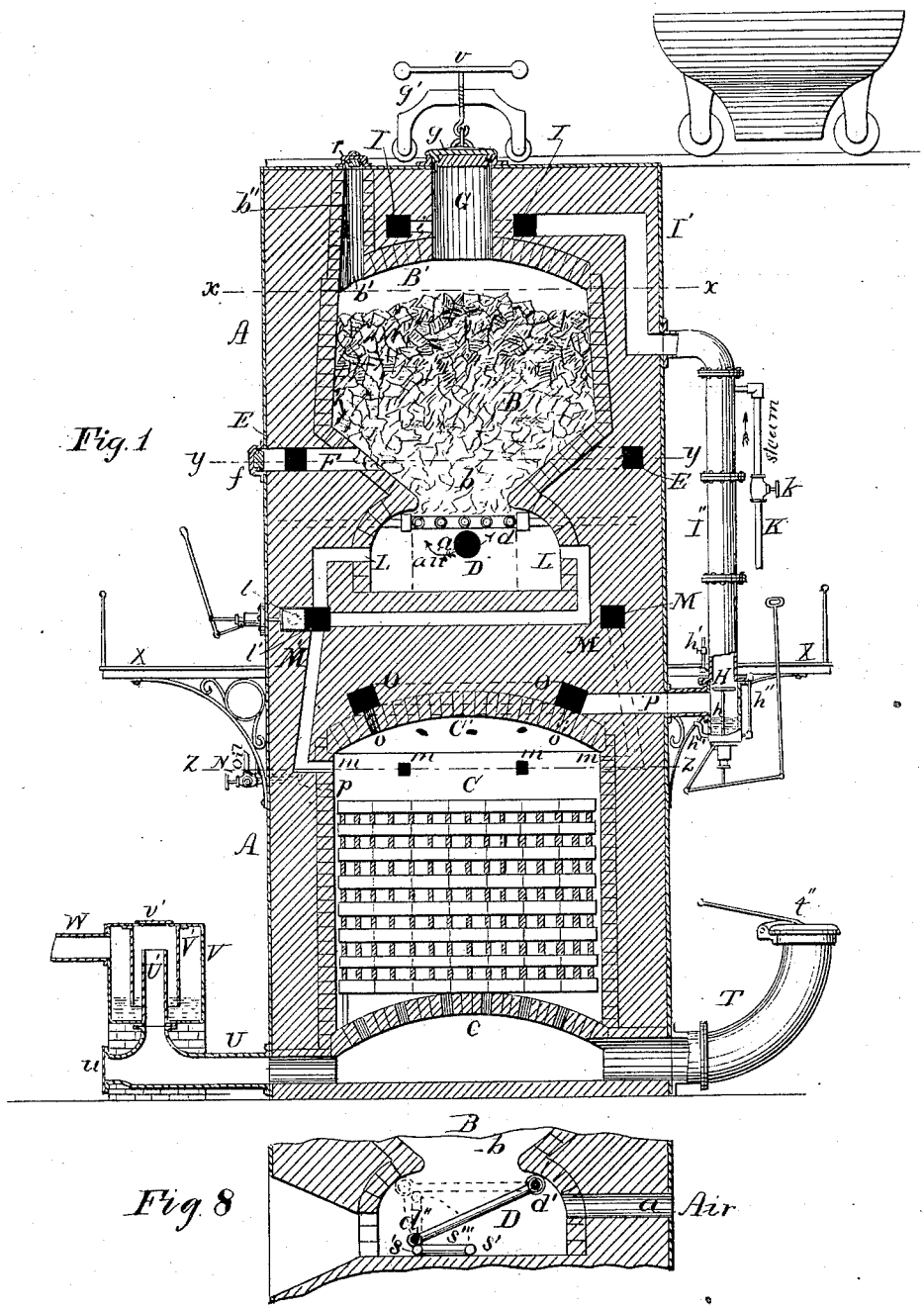

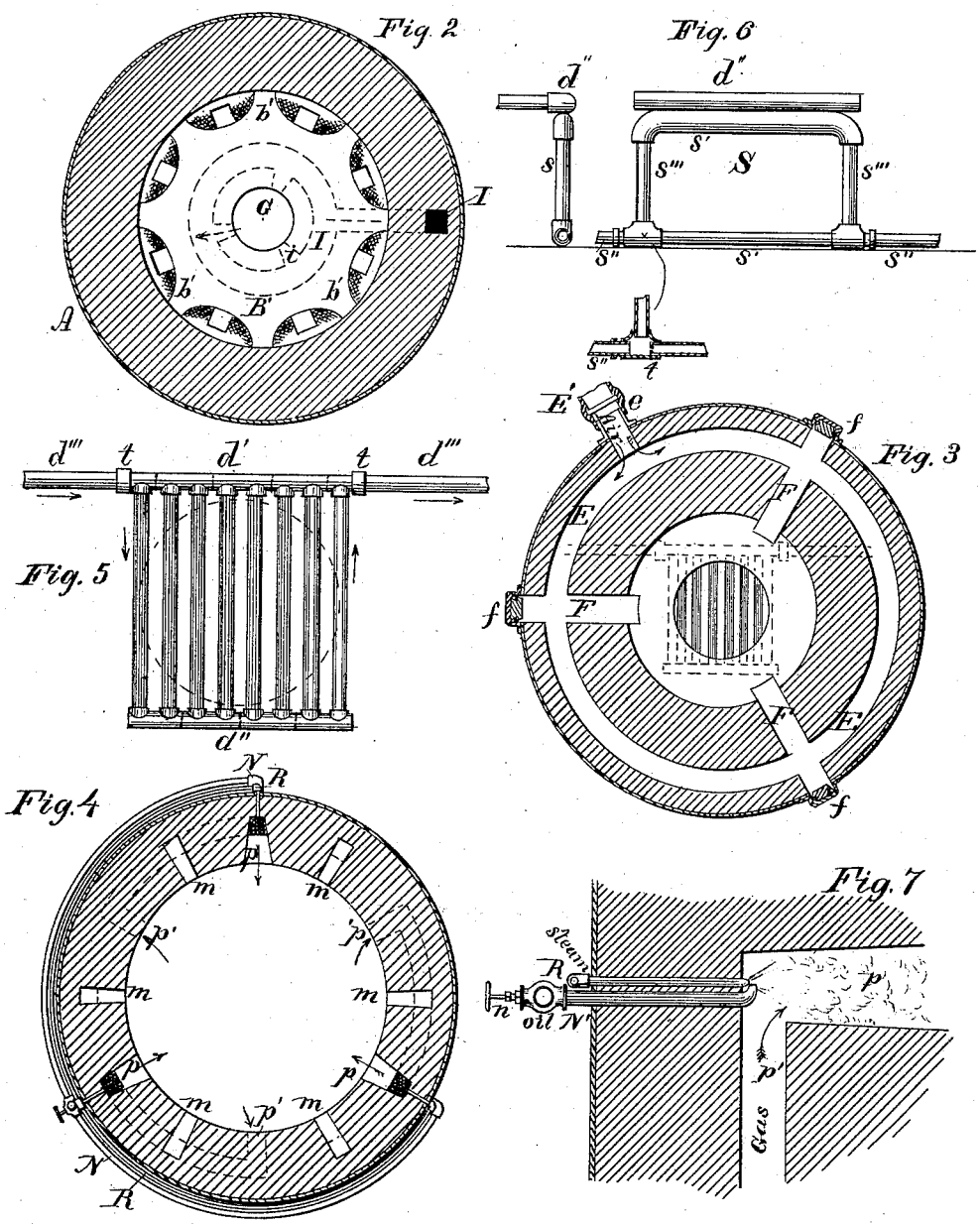

THEODORE G. SPRINGER AND GEORGE W. JEREMY, OF NEW YORK, N. Y.; SAID JEREMY ASSIGNOR TO SAID SPRINGER.

PROCESS OF MANUFACTURING GAS.

SPECIFICATION forming part of Letters Patent No. 314,486, dated March 24, 1885.

Application filed March 4, 1884. (No model.)

*To all whom it may concern:*

Be it known that we, THEODORE G. SPRINGER and GEORGE W. JEREMY, citizens of the United States, and residents of New York, county and State of New York, have invented new and useful Improvements in the Process of Manufacturing Gas, of which the following is a specification.

This invention relates to the process of generating gas for illumination, heating purposes, and motive power by decomposing steam in contact with incandescent material, forming carbonic oxide and hydrogen, carbureting the combined gases with hydrocarbons, then combining the gases and vapors and converting them into a fixed gas by contact with heated refractory material in a fixing-chamber.

In carrying out the process according to our invention a body of carbonaceous fuel—such as coke or anthracite coal—is raised to incandescence to a depth of several feet by a blast of air. The resulting hot gaseous products, containing a large per cent. of carbonic oxide, are conducted down into a fixing or superheating chamber containing refractory material, where they are burned by the admission of air, and the heat of the combustion is stored in the contained brick-work, the spent products of combustion being allowed to escape. The body of fuel and the fixing or superheating chamber being suitably heated, the air-blast is shut off, and steam is admitted into the heated body of fuel in a direction the reverse of that in which the air-blast was passed, preferably in a downward direction, and is thus brought first into contact with the less highly-heated portion of the fuel, where it is superheated, and is then forced down into the incandescent portion of the fuel, where it is completely decomposed into carbonic oxide and hydrogen. These gases are conducted through suitable flues or pipes down into the heated carbureting and fixing chamber, where they are intimately mixed with the vapor of hydrocarbon liquid, which liquid is forced and sprayed into the gases by a steam-jet or jet of gas under pressure, and the mingled gases and vapors are then combined and converted into a fixed gas by passage down through the heated brick-work, and such gas is finally conducted off through the hydraulic seal-box to the purifiers and holder, or directly to any desired place of use. The manufacture of gas is continued, as above described, till the fuel and fixing chamber are reduced too low in temperature to be practically operative, when the steam and oil are shut off and the fuel and fixing-chamber are again heated by the admission of the air-blast, as first described.

Heretofore in the manufacturing of gas it has been the common practice to admit the air-blast at the base of the fuel for heating it up, and then follow it by the steam passing in at the base of the fuel and through it in the same direction as the air; but we have found this method of operating quite objectionable, and at times inoperative, for the reason that the steam deadens the fuel at or near the base or for a short distance above the grate, the succeeding blast of air fails to ignite or revive the deadened fuel next to the grate, but carries the fire higher up into the body of fuel, and the succeeding supply of steam deadens the fuel still higher up, and so on, until finally a large mass of inactive fuel, ashes, and clinker is formed above the grate, so that it is difficult to heat up the fuel above or decompose steam, and it becomes necessary to stop the gas-making operation and clean the grate and fuel-chamber, and perhaps rekindle the fire, involving much loss of time and heat and much disagreeable labor. In our improved method of operating the apparatus we remedy these defects by admitting the air-blast only at the base or one end of the fuel, and admitting the steam at the top or opposite end of the fuel and passing it in the reverse direction to the course of the air, so that such steam is superheated and decomposed in the fuel above the grate, and the resulting gases will leave the fuel at and near the grate in a highly-heated condition, whereby such fuel may readily be revived or ignited and raised to incandescence by the succeeding air-blast. The fuel is thus burned to ashes, which may be readily removed with little or no interruption to the gas-making operation. Heretofore it has also been the practice to provide a separate superheating-chamber, or some special apparatus which must be specially heated for superheating the steam preparatory to its decomposition, but by our improved arrangement of parts and method of operation we do away with the special superheater and the expense of specially heating it. In order to secure these advantages and yet superheat the steam, we provide a deep bed of fuel and raise it to incandescence a distance of three or four feet from the grate, or from that end where the air-blast is admitted, at the same time highly heating the remaining portion of the fuel, so that it will superheat steam, but not decompose it. We then admit steam into the top of the fuel, or that portion less highly heated, where it is superheated, and then force it into the incandescent fuel, where it is decomposed. It is difficult and impracticable to raise more than three or four feet in depth of a body of fuel to incandescence; but by maintaining a deep body of fuel we can store up in the fuel the heat of the hot gases from below, and afterward advantageously utilize such stored heat for superheating steam prior to its decomposition by passing the steam into such heated fuel first, whereas if the steam were first passed into the incandescent portion of the fuel it would there be decomposed, rapidly cooling such portion, and the resulting gases would gain nothing by passing through the cooler fuel above. On the contrary, if the steam were admitted direct into the incandescent fuel at the same end as the air-blast, the disadvantages pointed out above would result. It is also advantageous to pass the steam down through the fuel, for the reason that it is thus more evenly spread out through the entire body of fuel and subjected to all the heated surfaces, and thereby completely decomposed into hydrogen and carbonic oxide with little or no production of carbonic acid, whereas if it is passed up through the fuel it is liable to form channels or to pass through channels in the fuel or between it and the furnace-walls, and thus escape complete decomposition, and, moreover, leave large portions of the fuel unacted upon. The steam is not only passed downward through the decomposing fuel, but gases resulting from its decomposition are passed down into the fixing-chamber, where they are carbureted, and then passed down and spread out through the entire body of heated brick and uniformly combined and fixed, securing results superior to those which could be attained by passing the gases up through the brick-work.

Our apparatus embodies a number of novel and important features of construction whereby improved results are secured; but such apparatus is not claimed herein, as it is made the subject of a separate application filed August 11, 1884, and bearing Serial No. 140,222.

The process constituting our invention will be pointed out in the claims.

Having stated the general nature of our invention, we will now particularly describe it with reference to the accompanying drawings, in which—

Figure 1 represents a vertical section of our improved cupola generating-furnace. Fig. 2 represents a horizontal section on line $x\,x$, looking up, for showing the construction of the crown of the furnace. Fig. 3 represents a horizontal section on line $y\,y$. Fig. 4 represents a horizontal section on line $z\,z$. Figs. 5 and 6 represent detailed views of the water-cooled grate, and Fig. 7 represents a detail view of the gas-circulating flue and oil-injector in the wall of the fixing chamber. Fig. 8 represents a vertical section of ash-pit and grate at right angles to the plane of Fig. 1.

The generator A is constructed of brick, and the fuel and decomposing chamber B, ash-pit D, and fixing or superheating chamber C, and the flues are lined with fire-brick, and the entire furnace structure is covered on the outside with a tight iron jacket, preferably of riveted plate-iron.

With the form of furnace and arrangement of parts shown in the drawings, it is intended to construct the fuel-chamber and the fixing-chamber of unusually large dimensions, and the conformation and arrangements of parts and the method of operating are all adapted for a furnace of extra large size. The fuel-chamber being of extra large horizontal area, the side walls are built so as to diverge slightly from the top down to or below the middle, from which point or line the walls are drawn in so as to form inwardly-inclined floors or boshes and a much contracted grate-opening, $b$, at the connection with the ash-pit, and thus requires but a comparatively small grate, which can be much more easily managed and is less expensive than a large one. Another reason for making the grate small is that it is made hollow and water-cooled to preserve it from rapid destruction by the heat, and it is desirable to present as little water-cooled surface to the fuel as possible. The shape of the fuel-chamber shown is found to be the most practical and successful, independent of any considerations as to the size of the grate. The walls immediately diverge from the passage $b$, so as to form a suitably-sized ash-pit, D, to accommodate the ashes without frequent removal. The grate $d$ is placed immediately below the projecting ring of the contracted opening $b$ of the fuel-chamber, and is made of hollow cross-heads $d'\,d''$ and connecting hollow bars. The cross-heads are provided with transverse partitions or stop-plates, as shown in dotted lines, so as to cause the water to circulate back and forth through the bars and heads. The head $d'$ or its tubular extension passes through the walls of the furnace on each side of the ash-pit in suitable stuffing-boxes, permitting the tubular head or its extensions to turn therein. The head $d'$ is connected to its tubular extensions or trunnions $d'''$ by union-couplings $t$, so that when desirable the grate can be quickly detached and removed from the furnace and replaced by a new one. The head $d'$ is supported by its hollow trunnions $d'''$ at the side of the ash-pit, opposite the door thereof, while the head $d''$ at the side next to the door is supported by a movable water-cooled truss or support, S, Fig. 6, which may be turned up or down for holding up or letting down the grate. This truss is composed of the tubular heads united by T-fittings with the bars $S'''$, which connect with the swinging cross-head $S'$. The T-fittings are also connected by union-couplings with the tubular extensions or journals $S''$, which project through the furnace-walls in stuffing-boxes, and serve to admit and carry off the cooling-water. The head $S'$ at its junction with the T-fitting, where the water enters, has a very small opening, $t'$, admitting only a small portion of the water, so that the main current thereof is caused to circulate through bars $S'''$ and cross-head $S'$, while a small portion flows through tubular head S, and the entire quantity finally flows off through journal $S''$, at the right-hand side. The hollow journals $d'''$ of the grate and $S''$ of the supporting-truss are to be provided outside of the furnace-wall with means—such as cranks or levers—for turning them, and thereby raising and lowering the free ends of the grate and truss.

With the grate and truss constructed as described, the truss, when turned up, as shown in Fig. 6, will support the grate in a horizontal position, and when turned down will allow the free end to drop down, and the grate thus forms a chute leading to the doorway of the ash-pit, and constitutes a ready means for drawing out the ashes and clinkers. An air-pipe (indicated by letter $a$) enters the ash-pit below the grate. In the wall of the furnace a short distance above the grate there is formed an annular flue, E, with which connects the air-blast pipe $E'$, having controlling-valve $e$. (See Fig. 3.) Converging passages or ports F, extending from the outside, intersect flue E and open internally into the fuel-chamber. These passages serve as tuyeres when air is admitted by pipe $E'$ and flue E for supplying air to the fuel. The ports being closed at their outer ends by removable stoppers $f$; they also serve as clinkering-openings for the insertion of bars to stir up the fuel, break and remove any clinker which may form, and shake down the ashes. They also serve for the insertion of auxiliary grate-bars for supporting the body of fuel above when the grate is dumped and cleaned. Many more parts than those shown in the drawings may be provided and used when required. One or more annular flues and circles of ports may be formed in the wall above the set shown in case of a high fuel-chamber, in order to heat and operate upon a greater depth of fuel-body. The crown $B'$ of the furnace is arched, and has around its circumference openings $b'$, from which extend through the top of the furnace clinking passages or ports $b''$, closed at the top by stoppers $r$. The charging-opening G for fuel extends through the center of the crown, and is closed by stopper or cover $g$, which is removed and replaced by a screw, $v$, and wheeled truck $g'$, running on rails on top of the cupola. A fuel-car is mounted on the same rails, and may be brought into position over the passage G and its fuel discharged into the furnace. An annular flue, I, surrounds passage G and opens into it by short passages $i$; or flue I may connect with the fuel-chamber by means of vertical passages through crown-arch $B'$. A flue, $I'$, passing through the furnace-wall, connects annular flue I with outside pipe, $I'$, which connects at its lower end by means of short flue P with annular flue O, opening by numerous ports $o$, passing through crown-arch $C'$, into the fixing or superheating chamber, C, which, as shown, is preferably placed at the base of the cupola, while the fuel and gas-producing chamber is preferably placed above or at the top of the cupola. In the lower end of pipe $I''$ is fixed valve H, having stem $h$ passing down through a stuffing-box at the end of the pipe. Valve H fits up against a suitable seat just above the opening of pipe P. Slightly above the valve-seat a water-inlet pipe, $h'$, connects, and at about the same height a discharge-pipe, $h''$, connects with pipe $I''$ and leads down below the valve, where it discharges into the lower end of the valve-chamber, and a water-sealed overflow-pipe, $h'''$, serves to maintain a proper level of water in such box. When valve H is raised to its seat, a small stream of water is admitted above it by pipe $h'$, and a sufficient quantity of water is maintained above the valve to perfectly seal the joint between it and the seat, and to keep the valve cool and prevent its destruction by heat. The overflow-pipe $h''$ and trap-pipe $h'''$ conduct away the excess of water. A steam-pipe, K, having valve $k$, connects with pipe $I''$, for supplying steam to the top of the fuel-chamber. Two flues, L, connect with the ash-pit, one on each side, and extend down and open into the annular flue M at the same point in its circumference, so as to meet at a common valve-box, $l'$, and both be controlled by the same valve $l$. This valve is composed of a fire-clay block, and is operated by a stem passing through a stuffing-box and a pivoted lever upon the outside of the furnace. Annular flue M is connected by the downward flues $M'$ and ports $m$ with the upper portion of the fixing or superheating chamber C. Flues L M $M'$ and ports $m$ serve to deliver water-gas from the ash-pit to the fixing-chamber, where it is carbureted by hydrocarbon liquid. They also serve to deliver air, as explained farther on. The hydrocarbon liquid is sprayed into the water-gas and intimately mixed therewith by one or more steam-jets or by jets of gas under pressure. The oil is admitted into ports $p$ by pipe N', branching from circular pipe N, the pipe N' having a turned-up jet-nozzle like an atomizer. Branch steam-pipes R' from a circular pipe, R, terminate in contracted nozzles just above the oil-pipe nozzles, the two in each place forming an atomizing or spraying injector, as shown, Fig. 7. A gas-circulating flue, $p'$, opens at one end into port $p$, near the spraying-injector, and passes through the wall some distance circumferentially and to a point below the port, where it opens into chamber C, as shown by dotted lines in Fig. 4. It is readily perceived that the spraying-injector would act to draw gas through flue $p'$ and intimately mix it with oil-vapor in the port $p$, and a number of these injectors, ports, and flues placed at intervals in the wall, as shown, would thoroughly mix the water-gas with the hydrocarbon vapor, and thus uniformly carburet it. Chamber C is provided near the bottom with a perforated arch, $c$, which supports the cellular brick-work, laid up in the form used in regenerator-furnaces. An outlet-pipe, T, having a close-fitting lid, $t''$, connecting below arch $c$, serves for the escape of waste products of combustion, and outlet-pipe U and branch U', opening into the hydraulic seal-box V, serve to conduct away the gas. The pendent pipe V', surrounding the upright pipe U', dips into the sealing-liquid in the box a sufficient distance to form a seal in a well-known manner. Pipe W conducts gas from the seal-box to the purifiers or scrubbers, or to a place of immediate use. A lid, $v'$, gives admission to the seal-box, and a lid, $u'$, gives admission to pipe U and the base of chamber C for cleaning and repairs. A platform, X, surrounds the furnace just below the ash-pit.

Having described the construction of our improved furnace, I will now describe its operations as follows: A fire is first kindled on the grate and allowed at first to burn by natural draft, the cover $g$ being removed for that purpose. Then as a larger body of coal is fed in, cover $g$ is placed upon its seat, closing passage G, lid $t''$ of pipe T is opened, and the combustion of the fuel is urged by an air-blast from pipe $a$, and the resulting gaseous products, containing a large per cent. of carbonic oxide, are conducted through flues I I', pipe I'', flues P O, and ports $o$ down into chamber C, where they are burned by jets of air issuing from ports $m$, which air is passed from the ash-pit through flues L, M, and M', the valves H and $l$ being open at this time. The combustion of the fuel and the gaseous products is continued till a bed of fuel several feet thick is raised to incandescence, and a large body of fuel above is highly heated, and the fixing-chamber is suitably heated. Then lid $t''$ and valve H are closed, and steam is admitted by pipe K into pipe I'', from which it passes through flues I' and I into the top of the fuel-chamber, taking up heat from such flues and carrying it back into the fuel-chamber. The steam thus heated is further superheated by passage through the upper portion of the body of fuel, and then is completely decomposed into hydrogen and carbonic oxide by passage through the incandescent lower portion of the fuel. The hot gas then passes from the ash-pit down through flues L, M, and M' into the top of fixing-chamber C, where it is uniformly carbureted with hydrocarbon vapor by means of the spraying-injectors and circulating-passages, as described. The carbureted gas is then combined and converted into a fixed illuminating-gas of uniform quality by passage down through the heated brick-work, and is finally conducted away by pipe U. The manufacture of gas in this manner is continued till the body of fuel is reduced too low in temperature to successfully decompose steam. Then the steam is shut off, and the body of fuel and fixing-chamber are again heated up by adjusting the valves and lids and admitting the air-blast, as before described. At the close of the operation of decomposing steam the fuel is left hottest on and just above the grate, and the brick about the ash-pit is also left highly heated, so that when the air-blast is let into the ash-pit it takes up the heat and conducts it into the fuel, which is readily ignited and quickly raised to incandescence. It is thus seen that heat stored in the flues and brick-work is carried by the air and steam and focused, as it were, in the fuel-chamber in the most advantageous and economical manner. Fuel is periodically charged through the passage G, for maintaining a sufficient body thereof in chamber B. Ashes and clinker are periodically cleaned from the grate and removed from the ash-pit. Clinker is removed from the side walls, and the fuel is shaken down by bars inserted through passages $b'$, extending through the furnace-crown. The quantity of air admitted to chamber C for supporting combustion of gaseous products therein is regulated by valve $l$.

The swinging grate and supporting-truss may be made solid, if desired.

Having described our invention, what we claim, and desire to secure by Letters Patent, is—

1. The process of manufacturing gas which consists in blasting a body of fuel with air in one direction till it is highly heated, using the resulting gaseous products for heating up a fixing-chamber, then superheating and decomposing steam by passing it first into the cooler portion of the fuel, and then down through the hottest portion thereof in a direction the reverse of the air-blast, carbureting the resulting water-gas, and then converting it into a fixed gas in a chamber by the heat previously stored from the waste gaseous products, for the purpose described.

2. The process of manufacturing gas which consists in highly heating a body of fuel by passing the air-blast up through it, and at the same time heating a fixing-chamber by means of the resulting gaseous products, then superheating and decomposing steam by passing it down through the heated body of fuel, carbureting the resulting water-gas, and then converting it into a fixed gas by passing it through the heated brick-work in the fixing-chamber, for the purposes described.

3. The process of manufacturing gas which consists in raising a portion of a body of fuel to incandescence and highly heating the remaining portion by an air-blast, and at the same time heating a carbureting and fixing chamber by the resulting gaseous products, then superheating steam in the least highly-heated portion of the fuel and decomposing it in the incandescent portion of the fuel, carbureting the resulting water-gas with hydrocarbon liquid sprayed into it, and mixing the gas and hydrocarbon vapor uniformly by drawing gas into the spray of hydrocarbon and injecting them together into the fixing-chamber, and finally converting the mixture into a fixed gas by passing it down through the heated fixing-chamber.

4. In the manufacture of illuminating-gas, the process of uniformly carbureting and fixing the water-gas, which consists in injecting a spray of hydrocarbon liquid into the gas and continuously drawing a portion of the gas through a suitable passage into the spray of hydrocarbon, and injecting them together into the fixing-chamber, and thereby circulating the gas and vapor from and into the same chamber till they are intimately mixed, then through highly-heated refractory material, as described.

In testimony that we claim the foregoing as our invention we have signed our names in presence of two witnesses.

THEODORE G. SPRINGER.
GEORGE W. JEREMY.

Witnesses:
BERNARD FLANAGAN,
JOSEPH MICHELSON.